(12) United States Patent
Galt et al.

(10) Patent No.: US 6,649,094 B1
(45) Date of Patent: Nov. 18, 2003

(54) METHOD OF PURGING SHOOTING POT AND PROVIDING ENHANCED PURGE CAPABILITY

(75) Inventors: John R. Galt, Nobleton (CA); Anthony Paulovic, Moncton (CA); Jerzy Szajak, Toronto (CA); Uwe K. Melisch, Bolton (CA)

(73) Assignee: Husky Injection Molding Systems, Ltd., Bolton (CA)

( * ) Notice: Subject to any disclaimer, the term of this patent is extended or adjusted under 35 U.S.C. 154(b) by 0 days.

(21) Appl. No.: 09/335,495

(22) Filed: Jun. 18, 1999

(51) Int. Cl.[7] .............................................. B29C 45/54
(52) U.S. Cl. ..................... 264/39; 264/328.19; 264/349
(58) Field of Search ....................... 264/39, 349, 328.1, 264/328.19

(56) References Cited

U.S. PATENT DOCUMENTS

| | | | |
|---|---|---|---|
| 2,950,501 A | 8/1960 | Harkenrider | |
| 3,006,032 A | * 10/1961 | Baker et al. | |
| 3,259,944 A | * 7/1966 | McIlvin | |
| 4,290,701 A | 9/1981 | Schad | 366/77 |
| 4,678,427 A | 7/1987 | Fritzsche | 425/562 |
| 5,380,186 A | 1/1995 | Hettinga et al. | 425/557 |
| 5,454,991 A | 10/1995 | Brew | 264/39 |
| 5,770,245 A | * 6/1998 | Takizawa et al. | 425/549 |
| 5,814,358 A | 9/1998 | Bock | 425/557 |
| 5,858,420 A | 1/1999 | Szajak et al. | 425/557 |

FOREIGN PATENT DOCUMENTS

JP 06 143345 5/1994 ........... B29C/45/24

* cited by examiner

*Primary Examiner*—Jill L. Heitbrink
(74) *Attorney, Agent, or Firm*—Katten Muchin Zavis Rosenman

(57) ABSTRACT

Methods for enhanced purging of an injection molding shooting pot assembly are provided. Old melt is purged from a shooting pot having an injection plunger slidably received in an injection cylinder. The plunger is moved by a powered piston, which moves the injection plunger to a purging position. The plunger is then arrested in the purging position. Sufficient new melt is injected through an inlet positioned such that the new melt sweeps substantially an entire volume of the injection cylinder ahead of the injection plunger in flowing between the inlet and a single outlet remote from the inlet.

20 Claims, 8 Drawing Sheets

METHOD OF PURGING SHOOTING POT AND PROVIDING ENHANCED PURGE CAPABILITY

FIELD OF THE INVENTION

This invention relates to pre-plasticizing injection molding machines using shooting pots as intermediate reservoirs of melted plastic resin. More particularly this invention relates to apparatus and methods for improving colour changing of resins to reduce changeover time and resin wastage.

BACKGROUND OF THE INVENTION

A conventional two stage or "pre-plasticizing" injection molding machine comprises, in general, a plasticizing component having a screw in a heated barrel and an injection component having an injection plunger. Polymer resin plasticized in the plasticizing component is transferred to the injection component's chamber, or "shooting pot", by way of a feed channel and is injected into a mold cavity through a nozzle by the injection plunger. Conventionally, a distributor or ball check valve in the feed channel prevents resin in the shooting pot from flowing backwards to the plasticizing component when the injector plunger injects the resin.

When the resin is changed to a different colour or different resin type, the previously processed resin must be purged from the extruder and the shooting pot before processing using the new colour or resin can begin. Typically, the new resin is used to purge the old resin.

U.S. Pat. No. 4,290,701 to Schad shows a typical pre-plasticizing injection unit for a molding machine. The shooting pot design shown in the '701 patent is a "last-in-first-out" style because the same port to an injection cylinder is used to both fill the cylinder and empty it. Although the injection plunger has a profile matching both the cylinder bore and an internal surface of a shooting pot head covering an end of the cylinder, and the injection plunger can be "bottomed out" when advanced until it contacts the cylinder head, some resin remains behind when purging. Because the "remaining" resin may remain in the shooting pot longer than most of the through-feeding resin, it can degrade and mix into the melt stream causing imperfections in the molded articles. Multiple feedings of the new resin to and from the shooting pot are typically required to clean out the prior resin. This can be both time consuming and wasteful of expensive resin material. For example, if a large component such as a garbage bin is being molded, changeover may require 50 to 100 cycles and takes a significant amount of time to complete.

U.S. Pat. No. 2,950,501 to Harkenrider is an early example of a "first-in-first-out" shooting pot design. By placing an entry port to the shooting pot at the maximum volume location of the plunger, the first resin entering the cylinder will move to the cylinder head end of the injection cylinder adjacent an exit port so that when the plunger is advanced, the "first-in" resin is injected into the mold, or purged as the case may be. Similarly, the "last-in" resin will be the last to be expelled. The disadvantage of this design is that variable shooting pot volumes, requiring a different shooting pot piston starting position other than maximum volume cannot be easily accommodated. The piston must be fully retracted each time the shooting pot is to be loaded prior to a molding cycle. Partial fillings cannot be made without risking air entering the cylinder and mixing with the resin.

U.S. Pat. No. 5,380,186 to Hettinga et al. shows a shooting pot cylinder having a hollow piston through which the resin is fed to the shooting pot. This "first-in-first-out" style allows for various volume fillings of the cylinder, but means that the construction of the injection unit becomes very long as the extruder and shooting pot are mounted on the same center line.

U.S. Pat. No. 5,814,358 to Bock shows another arrangement of a "first-in-first-out" shooting pot and extruder. In this arrangement, the shooting pot plunger is mounted inside a moveable shooting pot cylinder which is itself mounted inside an outer heated cylinder. The complication of this construction adds more places for the resin to "hangup" and degrade and increases cost.

U.S. Pat. No. 5,858,420 to Szajak et al. shows a "first-in-last-out" arrangement having separate channels used for the transfer of resin and the injection of resin. Transferred resin is brought into the shooting pot head behind resin retained from previous shots by the use of a plurality of channels communicating with the periphery of a conical tip of the shooting pot plunger head. The melt is therefore distributed more uniformly into the shooting pot and during injection, resin retained from the last cycle is injected first through the separate injection channel. Although this arrangement gives improved purging, some stagnation nevertheless exists requiring numerous cycles to properly effect a resin type or colour changeover.

SUMMARY OF THE INVENTION

A method is provided for purging a shooting pot having an injection plunger slidably received in an injection cylinder. The method comprises the steps of:

i) moving the injection plunger to a purging position;
ii) arresting the injection plunger in the purging position;
iii) injecting melt into the injection cylinder through a melt inlet; and,
iv) discharging melt through an outlet remote from the inlet.

Preferably, the inlet and outlet are positioned to cause injected melt to sweep substantially an entire volume of the injection cylinder ahead of the injection plunger as injected melt flows between the inlet and the outlet.

In one embodiment, in the purging position, a tip of the injection plunger is positioned adjacent a corresponding shooting pot head covering an end of the injection cylinder. The melt inlet is adjacent an outer periphery of the tip and the melt outlet is generally co-axial with the injection cylinder.

In an alternate embodiment, the injection cylinder is provided with at least one outlet ordinarily covered by the piston and in moving the injection plunger into the purging position, the injection plunger is overstroked to uncover the outlet.

The outlet in the alternate embodiment may be a drool port which leads from a channel extending circumferentially about the injection cylinder and in the purging position the injection plunger at least partially uncovers the channel.

The position of the injection plunger in the purging position may be incrementally variable to vary a degree to which the circumferential outlet is uncovered to optimize purging.

A shooting pot is provided for an injection molding machine. The shooting pot has an injection cylinder with a shooting pot head covering an end thereof. An injection plunger is slidably received in the bore in a substantially fluid sealed manner. A melt passage extends through the shooting pot head into a first end of the bore. A drool port is located distal the melt passage for discharging melt seeping between the injection plunger and the injection cylinder. An actuator moves the injection plunger reciprocally along the bore over a first distance corresponding to an injection stroke. The injection plunger covers the drool port over the injection stroke. An overstroker is provided to move the injection plunger along the bore to a purging position in which the drool port is at least partially uncovered. The shooting pot has an arrestor for arresting the injection plunger in the purging position.

The actuator may also act as the overstroker and a channel may extend circumferentially about the bore at the drool port. The shooting pot may also include a distributor valve for selectively providing fluid communication between the melt passage and either of an extruder feed line and a nozzle.

An alternate embodiment shooting pot is provided which has an injection cylinder with a bore, a shooting pot head over an end of the bore and an injection plunger slidably received in the bore in a substantially fluid sealed manner. At least one inlet extends through the shooting pot head and at least one outlet also extends through the shooting pot head. The shooting pot includes a reconfigurable flow controller moveable between load, eject and purge configurations. In the load configuration, the flow controller allows melt flow into the inlet and prevents melt flow at the outlet. In the eject configuration, the flow controller prevents melt flow at the inlet and allows melt flow out of the outlet. In the purging configuration, the flow controller allows melt flow into the bore through the inlet and out of the bore through the outlet.

DESCRIPTION OF THE DRAWINGS

Preferred embodiments of the present invention are described below with reference to the accompanying drawings in which.

DESCRIPTION OF PREFERRED EMBODIMENTS

Figure 1:
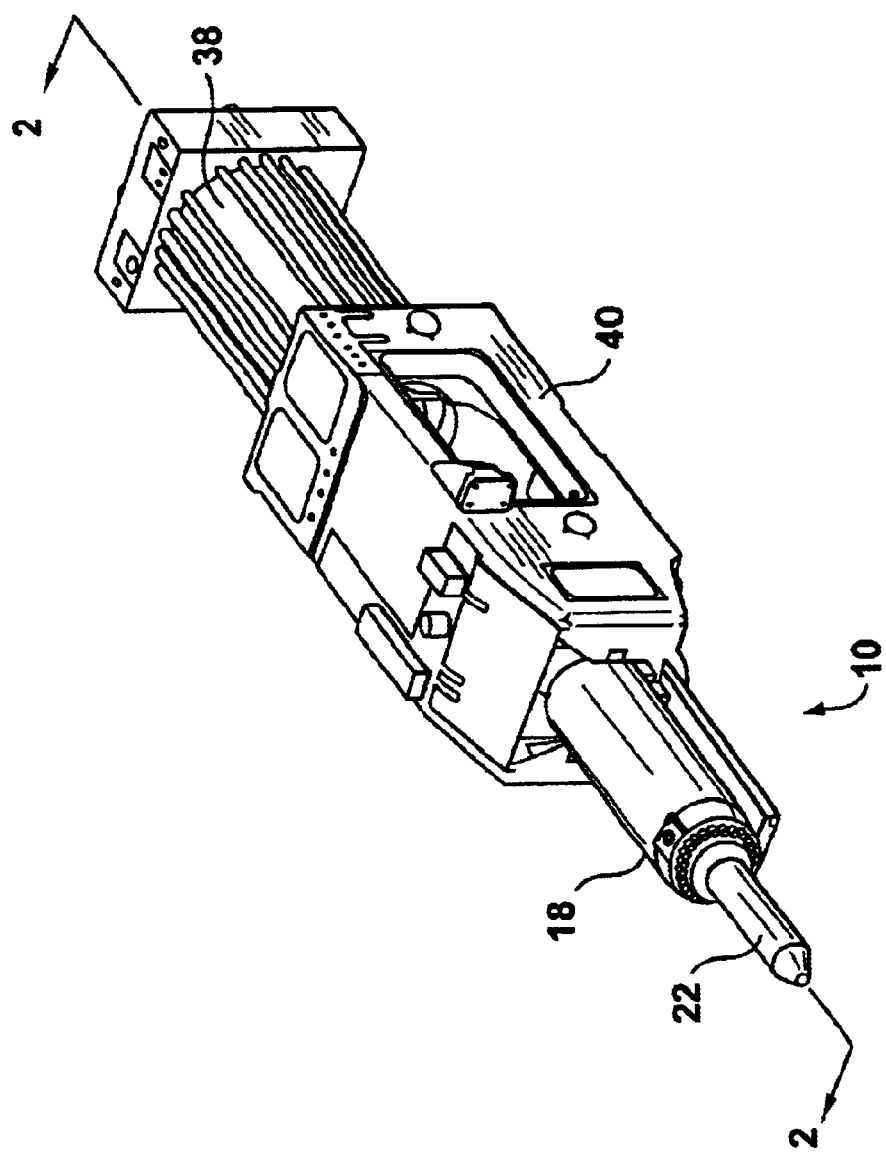
FIG. 1 is an isometric view of a shooting pot according to the present invention.
Figure 2:
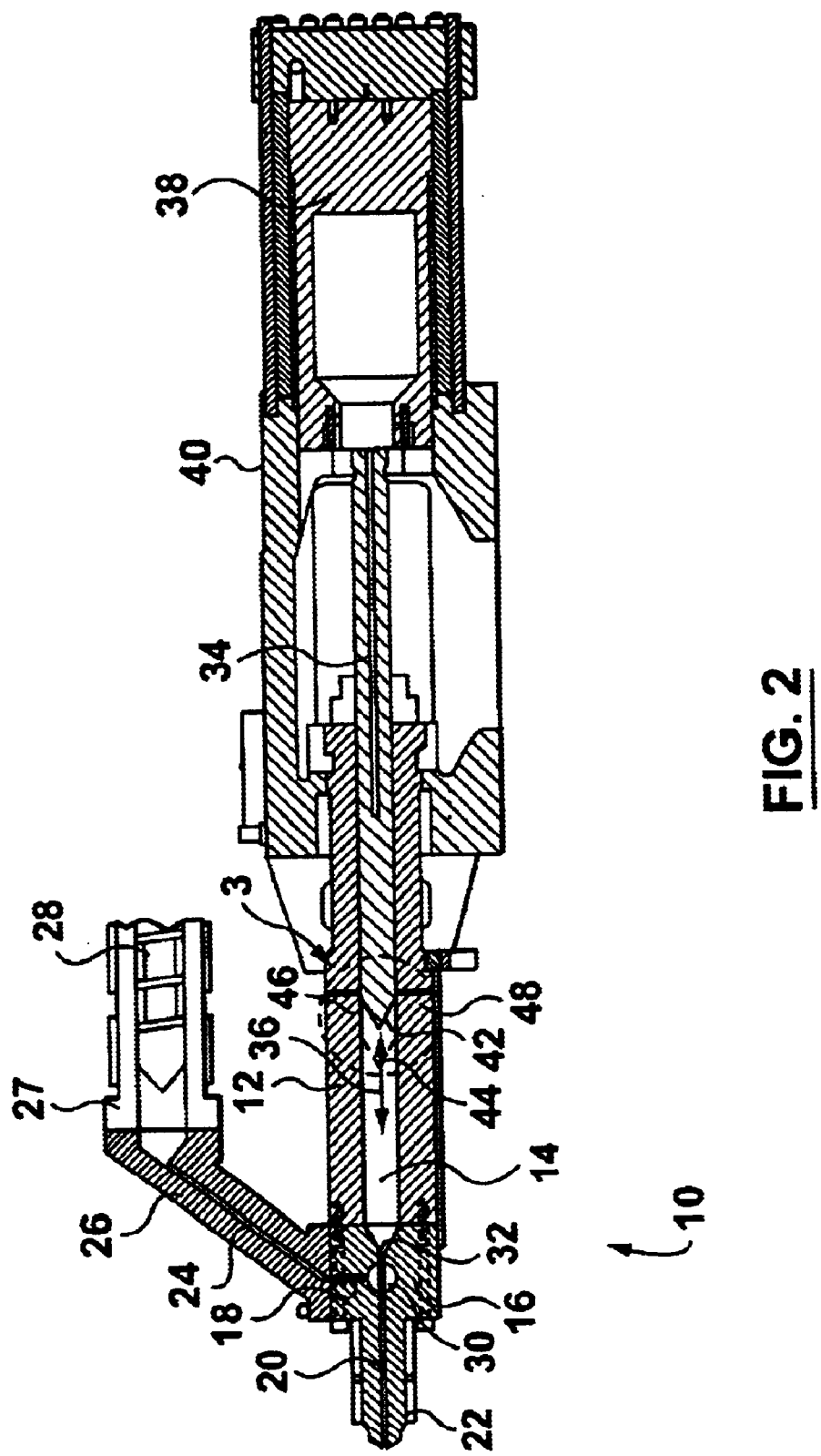
FIG. 2 is a section on line 2—2 of FIG. 1.

A shooting pot according to the present invention is generally indicated by reference 10 in FIGS. 1 and 2. The shooting pot 10 includes an injection cylinder 12 having a bore 14. A shooting pot head 16 extends over and covers an end of the bore 14. The shooting pot head 16 contains an extruder feed passage 18 and a nozzle passage 20. The extruder feed passage 18 fluidly communicates, through a connecting passage 24 in a connecting member 26, with a head 27 of a plasticizing extruder 28 (The connecting member 26 and plasticizing extruder 28 do not appear in FIG. 1).

A distributor valve 30 is located in the shooting pot head 16 for selectively providing fluid communication between a melt passage 32 extending through the shooting pot head 16 and either of the extruder feed passage 18 and the nozzle passage 20. The distributor valve 30 closes the nozzle passage during filling of the bore 14 and closes the extruder feed passage 18 during ejection of melt from the bore 14.

An injection plunger 34 is slidably received in the bore 14 and reciprocally moveable along the bore 14 in the direction of arrows 36 by an actuator 38 which, as illustrated, may be a hydraulically operable piston. The actuator 38 is connected to the shooting pot 10 by an injection housing 40.

During use for injection molding, the injection plunger 34 is reciprocally moveable over an injection stroke in which a tip 42 of the injection plunger moves from adjacent the shooting pot head 16 to the position indicated by dashed lines 44.

Although the injection plunger is substantially sealed relative to the bore 14, some melt seepage is typically permitted between the injection plunger 34 and the bore 14 for lubrication. The melt seeping past the plunger 34 is captured in a channel 46 extending about the bore 14 and discharged through a drool port 48 extending through the injection cylinder 12. The channel 46 and drool port 48 are ordinarily covered by the injection plunger 34 over the injection stroke.

The injection plunger 34 is movable into an overstroked position illustrated in solid lines in FIG. 2 wherein the tip 42 of the injection plunger 34 uncovers the channel 46 and thereby also uncovers the drool port 48. Overstroking may be achieved by an "overstroker" which may be the hydraulically actuatable piston used for the actuator 38 or possibly a separate apparatus.

For purging, the injection plunger 34 is moved into a purging position corresponding to the overstroked position described above. The injection plunger 34 is "arrested" in the purge position by any suitable arrestor such as hydraulic blocking of the piston forming the actuator 38. The distributor valve 30 is moved to a configuration to admit melt from the plasticizing extruder 28 into the bore 14. The incoming melt flows through the bore 14 into the channel 46 to exit through the drool port 48. This provides enhanced purging as melt is caused to flow through what is usually a stagnant area at the injection plunger tip 42 adjacent the wall of the bore 14.

Figure 3A:
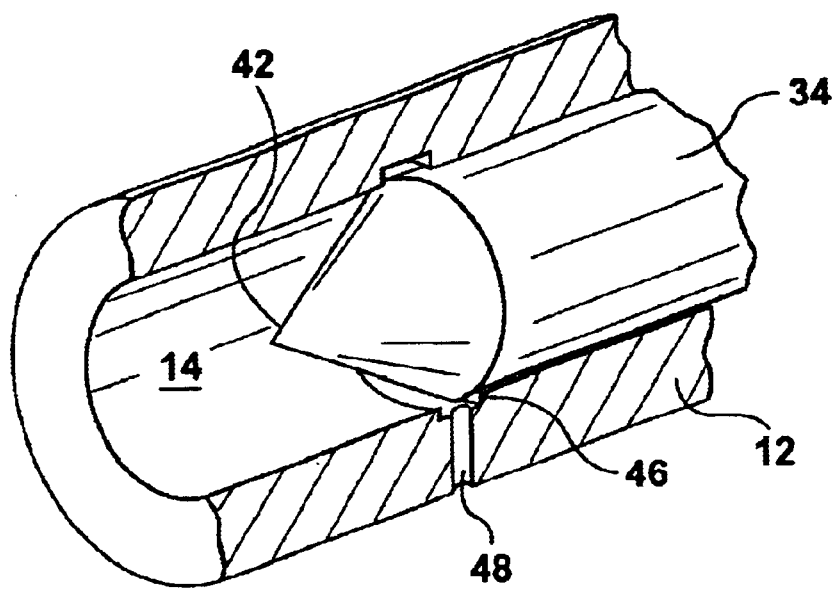
FIG. 3A is a partially cut away enlarged isometric view of the area encircled by circle 3 in FIG. 2.
Figure 3B:
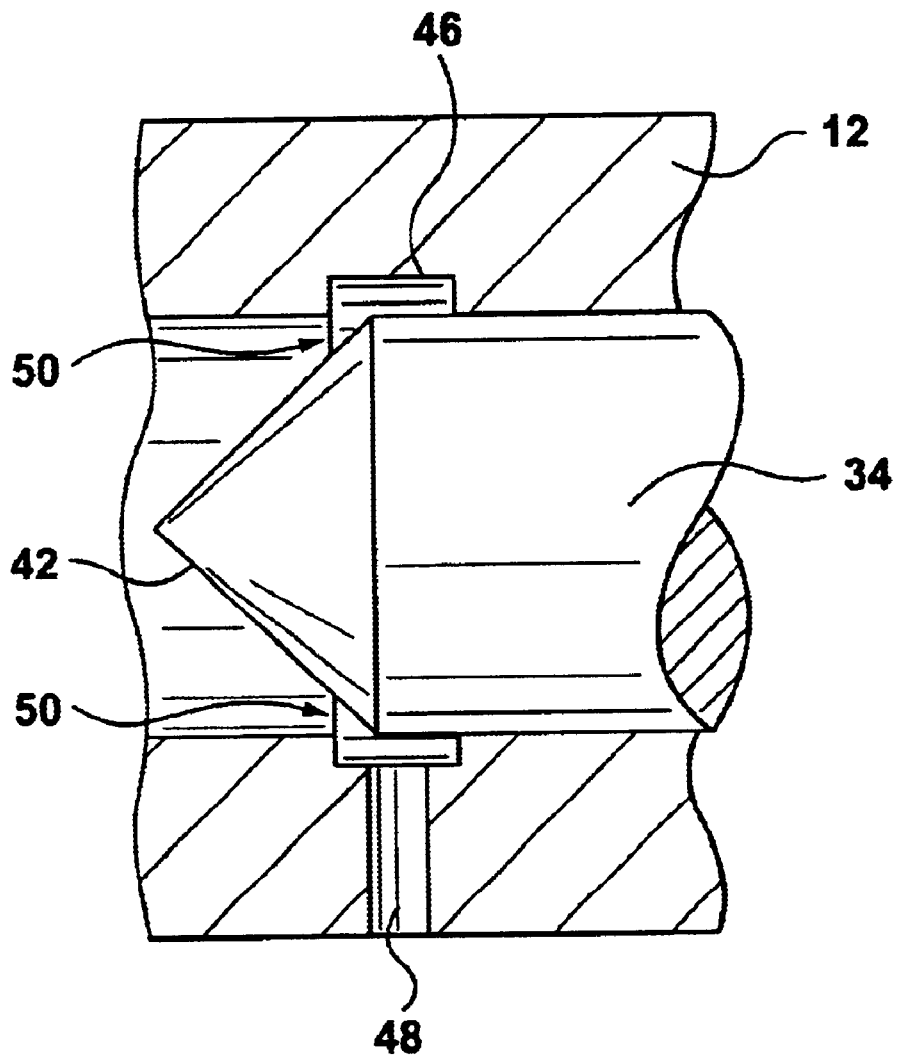
FIG. 3B is a partially cut away plan view of the area encircled by circle 3 in FIG. 2.

FIGS. 3A and 3B illustrate the relationship between the injection plunger tip 14 and the channel 46 in more detail. In the purging position a gap 50 is defined between the tip 42 of the injection plunger 34 and the channel 46. The gap 50 acts as a flow restriction which will locally cause shear heating of the melt as it enters the channel 46. This local reheating of the resin causes it to flow more easily and flush out of the system. The breadth of the gap 50 may be varied to suit the characteristics of the particular resin being purged to create more or less shear as required. A large gap causes less shear and less heating whereas a narrower gap increase the amount of both shear and heating.

In order to vary the gap the injection plunger 34 should be incrementally moveable in the overstroked position. This may be achieved either using the actuator 38 or other overstroker if a separate one is provided.

Figure 4:
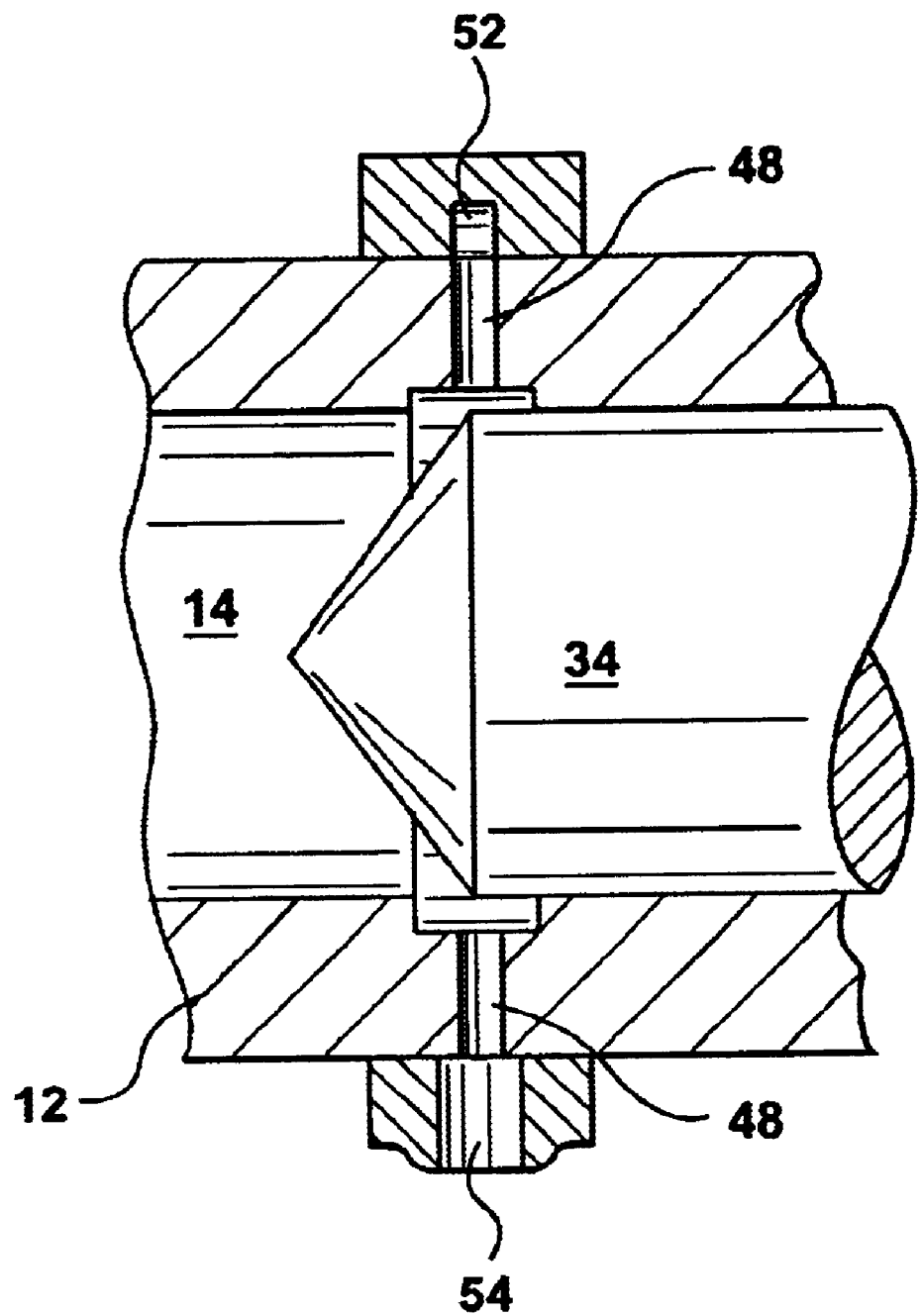
FIG. 4 is a view corresponding to FIG. 3B of an alternate embodiment of the present invention.

FIG. 4 illustrates an alternate embodiment in which a plurality of drool ports 48 are provided to direct purged resin to a collector channel 52 extending about the cylinder 34 and having an outlet 54 at a lower part thereof. The FIG. 4 embodiment provides further passages for purged material to better flush out the purged material than would be expected with the single, bottom, gravity influenced drool port 48 in the FIGS. 3A and 3B embodiment.

Figure 5:
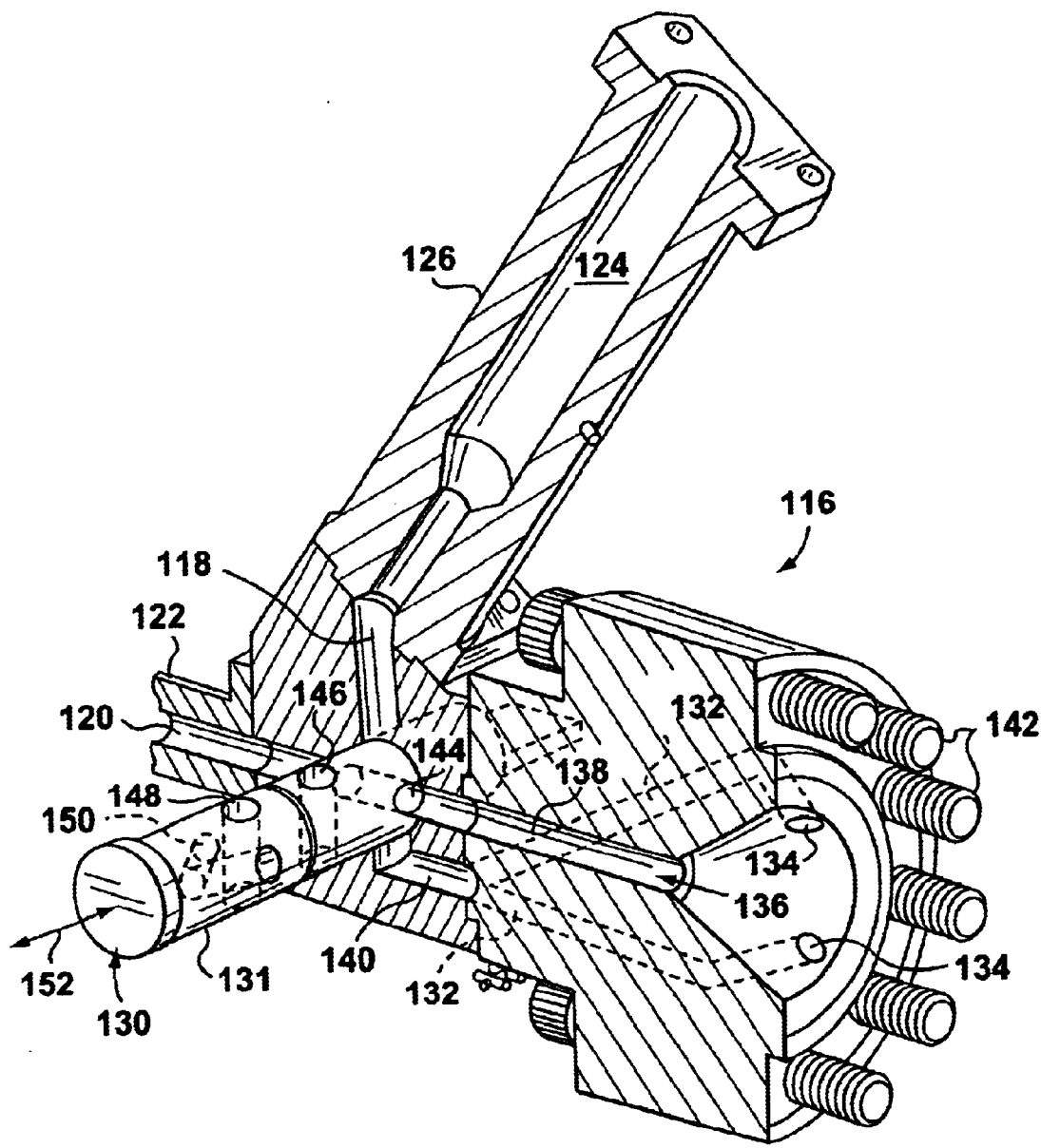
FIG. 5 is a cut away isometric view of an alternate embodiment of a shooting pot head according to the present invention.
Figure 6:
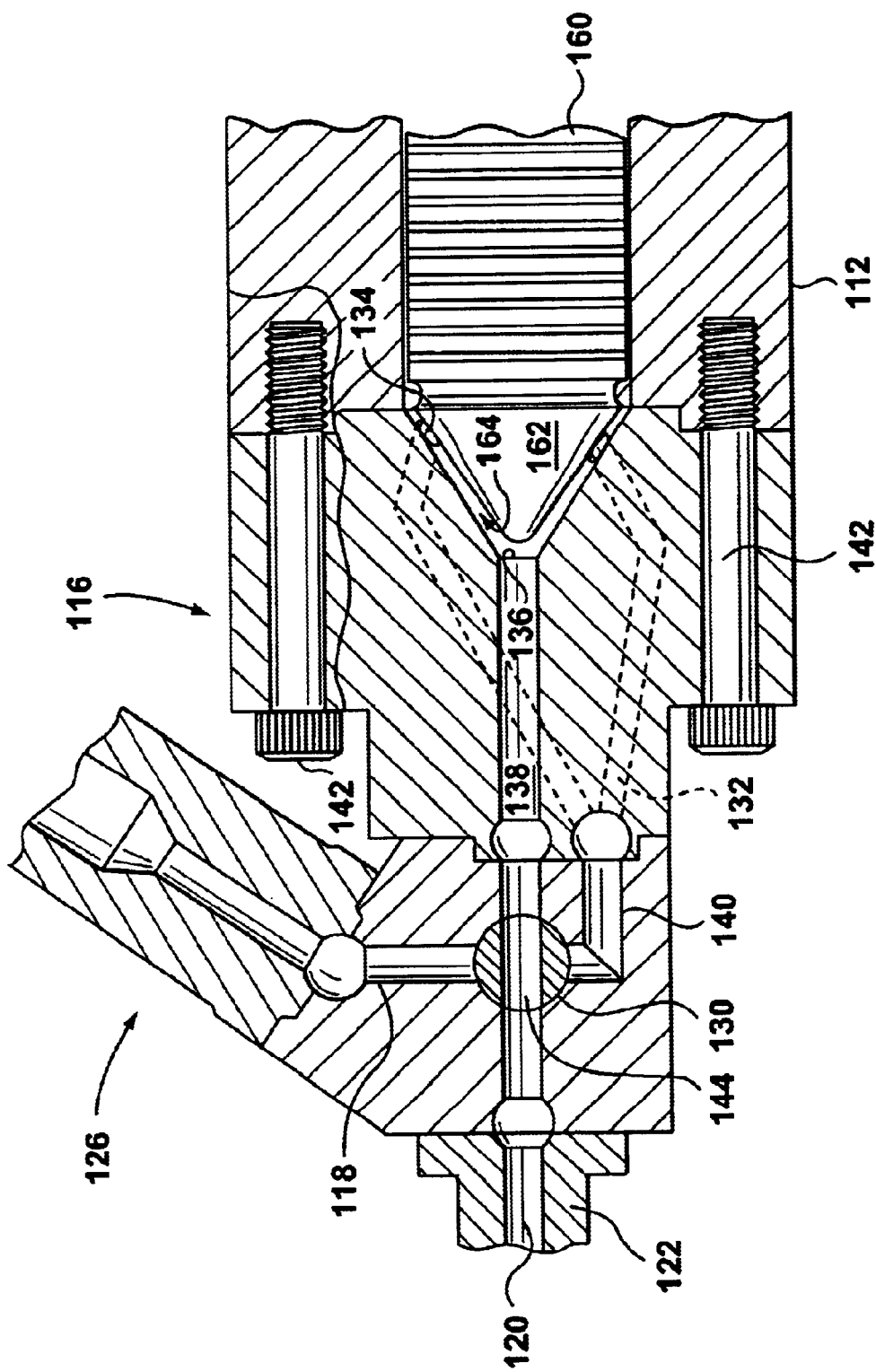
FIG. 6 is a section corresponding to FIG. 5 illustrating a flow controller in an eject position; and, FIG. 7 is a view similar to FIG. 6, but illustrating the flow controller in a load position.
Figure 7:
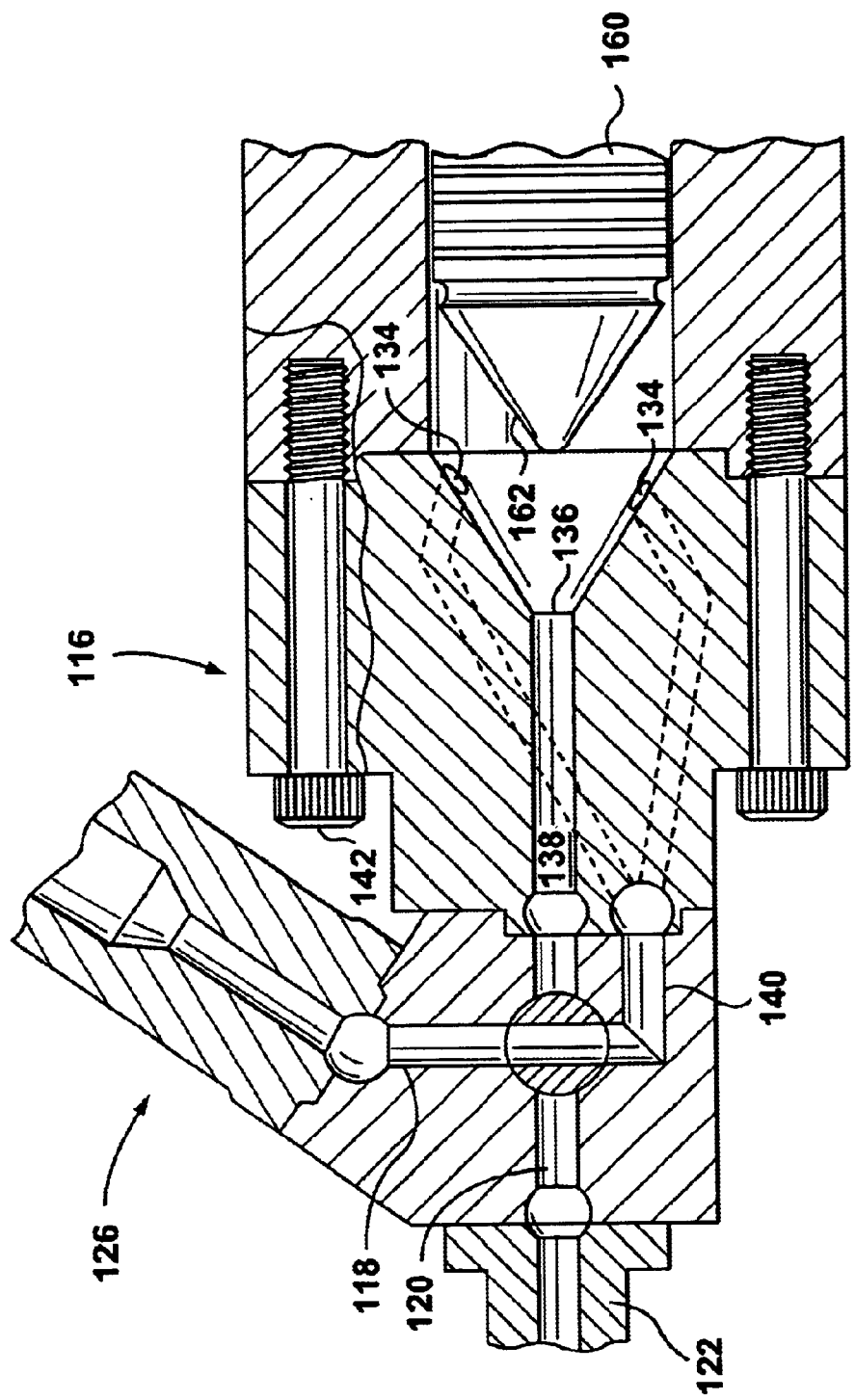

FIGS. 5, 6 and 7 illustrate an alternate embodiment of a shooting pot head generally indicated by reference 116 which is adapted for purging according to the method disclosed herein. The shooting pot head 116 has a plurality of inlet passages 132 (two are shown) terminating in inlets 134 and a single outlet 136 extending into an outlet passage 138 extending therethrough. Typically four inlets 134 would be provided but other numbers are also feasible. The inlet passages 132 may all branch off of a common inlet passage 140 across from an extruder feed passage 118. The extruder feed passage fluidly communicates with a connecting passage 124 of a connecting member 126 for connecting the shooting pot head 116 with a plasticizing extruder (not shown).

The outlet passage 138 is directly across from a nozzle passage 120 extending through a nozzle 122. Bolts 142 are provided to mount the shooting pot head 116 onto a shooting pot cylinder 112 in FIGS. 6 and 7.

A reconfigurable flow controller 130 having a body 131 is provided to control melt flow as required. The flow controller 130 has a number of bores 144, 146, 148 and 150 extending therethrough. The flow controller 130 is axially movable in the direction of arrows 152 between load, eject and purge configurations.

The eject configuration is illustrated in FIGS. 5 and 6. In this configuration the bore 144 registers with the nozzle passage 120 and the outlet passage 138 to allow melt to flow out of the outlet 136. In the eject configuration, the flow controller body 131 blocks melt flow between the extruder feed passage 118 and the common inlet passage 140 thereby preventing melt flow through the outlets 134. The eject configuration would correspond to an injection stroke.

The load configuration is illustrated in FIG. 7. In the load configuration the bore 146 is slid into registry with the extruder feed passage 118 and common inlet passage 140 to allow melt to flow from the plasticizing extruder through the inlets 134 and into the bore. In the load configuration the flow controller body 131 blocks melt flow between the outlet passage 138 and the nozzle passage 120. The load configuration corresponds to the filling of the shooting pot.

For purging, bores 148 and 150 are provided which simultaneously allow melt flow through the inlets 134 and out of the outlet 136. In the purging configuration, the bore 148 registers with the extruder feed passage 118 and the common inlet passage 140 allowing melt flow therebetween. In the purging configuration the bore 150 registers with the outlet passage 138 and the nozzle passage 120 allowing melt flow therebetween.

For purging, an injection plunger 160 having a tip 162 is moved into the position illustrated in FIG. 6 in which the injection plunger tip 162 is adjacent the shooting pot head 116. The injection plunger is arrested in this position. Melt is fed through the inlets 134 from where it flows across the portion of the injection cylinder bore defined between the injection plunger tip 162 and the shooting pot head 116, to flow out through the outlet 138. Preferably, the position of the injection plunger is incrementally variable in the purging position to vary the breadth of a gap 164 defined between the injection plunger tip 162 and the shooting pot head 116. The breadth of the gap 164 will affect the temperature of the melt by affecting the degree of shearing. The breadth of the gap 164 will affect the temperature of the melt by affecting the degree of shearing. The breadth of the gap 164 may be selected to suit the particular characteristics of the resin being purged.

It will be appreciated that the above embodiments for a shooting pot design enable enhanced purging as compared to previous designs in which an injection plunger is used for moving melt for purging. According to the method of the present invention, the injection plunger is kept stationary during purging and melt is fed in a path extending either radially inwardly or radially outwardly between an inlet and an outlet of an injection cylinder to substantially sweep the entire volume of the injection cylinder bore during purging. This is much more effective than moving melt with the injection plunger during purging as it causes melt to flow through areas which tend to be stagnant in injection plunger induced melt flow.

The above description is intended in an illustrative rather than a restrictive sense. Variations to the exact embodiments described above may be apparent to persons skilled in injection molding apparatus without departing from the spirit and scope of the invention as defined by the claims set out below.

We claim:

1. A method of purging old melt from a shooting pot having an injection plunger slidably received in an injection cylinder said plunger being moved by a powered piston, said method comprising the steps of:

i) moving said injection plunger to a purging position;

ii) arresting said injection plunger in said purging position; and iii) injecting sufficient new melt through an inlet positioned such that said new melt sweeps substantially an entire volume of said injection cylinder ahead of said injection plunger in flowing between said inlet and a single outlet remote from said inlet.

2. A method according to claim 1 wherein:

said injection plunger is incrementally moved to vary a distance between a tip of said injection plunger and a shooting pot head covering an end of said injection cylinder to an optimal position at which said purging is most effective.

3. A method according to claim 1 wherein:

said injected new melt flows radially outwardly between said inlet and said outlet.

4. A method according to claim 3 wherein:

said injection cylinder has at least one outlet ordinarily covered by said piston; and, in moving said injection plunger into said purging position, said injection plunger is overstroked to at least partially uncover each said at least one outlet.

5. A method according to claim 4 wherein:

each said at least one outlet is a drool port and leads from a channel extending circumferentially about said injection cylinder; and, in said purging position said injection plunger at least partially uncovers said channel.

6. A method according to claim 5 wherein:

a position of said injection plunger in said purging position is incrementally variable to vary a degree to which said circumferential outlet is uncovered to optimize said purging.

7. The method of claim 1, wherein said injection plunger is oriented such that it slides in a substantially horizontal direction.

8. A method of purging old melt from a shooting pot having an injection plunger slidably received in an injection cylinder communicating with an injection nozzle and an extruder via a flow distribution controller, said method comprising the steps of:

i) moving said injection plunger to a purging position;

ii) arresting said injection plunger in said purging position;

iii) adjusting said flow controller to a purging position;

iv) injecting new melt from said extruder through a purging melt inlet communicating with said injection cylinder and formed by said flow controller;

v) simultaneously using the injected new melt to purge old melt from said injection cylinder through a purging melt outlet communicating with said injection nozzle and formed by said flow controller; and vi) injecting sufficient new melt into said injection cylinder to purge said old melt through said melt outlet communicating with said injection nozzle.

9. A method according to claim 8 wherein said inlet and said outlet are positioned to cause injected new melt to sweep substantially an entire volume of said injection cylinder ahead of said injection plunger in flowing between said inlet and said outlet.

10. A method according to claim 9 wherein:

said new melt injected through said melt inlet flows radially inwardly toward said melt outlet.

11. A method according to claim 10 wherein:

in said purge position a tip of said injection plunger is adjacent a corresponding shooting pot head covering an end of said injection cylinder; and said melt inlet is adjacent an outer periphery of said tip.

12. A method according to claim 11 wherein:

said injection plunger is incrementally moved to vary a gap between said tip of said injection plunger and said shooting pot head to an optimal position at which said purging is most effective.

13. The method of claim 8, wherein said injection plunger is oriented such that it slides in a substantially horizontal direction.

14. A method of purging old melt from a shooting pot having an injection plunger slidably received in an injection cylinder communicating with an injection nozzle and an extruder via a flow controller, said method comprising the steps of:

i) moving said injection plunger to a purging position;

ii) arresting said injection plunger in said purging position;

iii) adjusting said flow controller to a purging position;

iv) injecting new melt from said extruder through an inlet communicating with said injection cylinder and formed by said flow controller;

v) using the injected new melt to purge old melt from said injection cylinder through an outlet remote from said inlet and said injection nozzle; and vi) injecting sufficient new melt through said inlet into said injection cylinder to purge said old melt through said outlet remote from said inlet and said injection nozzle.

15. A method according to claim 14 wherein said inlet and said outlet are positioned to cause injected new melt to sweep substantially an entire volume of said injection cylinder ahead of said injection plunger in flowing between said inlet and said outlet.

16. A method according to claim 14 wherein:

said injection plunger is incrementally moved to vary a gap between a tip of the injection plunger and a channel communicating with said outlet remote from said inlet and said injection nozzle to an optimal position at which said purging is most effective.

17. A method according to claim 16 wherein:

said injected new melt flows radially outwardly between said inlet and said outlet.

18. A method according to claim 17 wherein:

said injection cylinder has at least one outlet ordinarily covered by said piston; and, in moving said injection plunger into said purging position, said injection plunger is overstroked to at least partially uncover each said at least one outlet.

19. A method according to claim 18 wherein:

each said at least one outlet is a drool port and leads from a channel extending circumferentially about said injection cylinder; and, in said purging position said injection plunger at least partially uncovers said channel.

20. The method of claim 14, wherein said injection plunger is oriented such that it slides in a substantially horizontal direction.

* * * * *